(12) United States Patent
Alvarez Ponce et al.

(10) Patent No.: US 12,715,387 B2
(45) Date of Patent: Aug. 25, 2026

(54) TETHER PROTECTION PANEL FOR AIRBAG MODULE

(71) Applicant: ZF Passive Safety Systems US Inc., Washington, MI (US)

(72) Inventors: Alvaro Ivan Alvarez Ponce, Chihuahua (MX); Angel Martinez, Shelby Township, MI (US); Annmarie McMillan, Romeo, MI (US)

(73) Assignee: ZF PASSIVE SAFETY SYSTEMS US LLC, Washington, MI (US)

( * ) Notice: Subject to any disclaimer, the term of this patent is extended or adjusted under 35 U.S.C. 154(b) by 0 days.

(21) Appl. No.: 19/240,500

(22) Filed: Jun. 17, 2025

(65) Prior Publication Data

US 2026/0125024 A1 May 7, 2026

Related U.S. Application Data

(63) Continuation-in-part of application No. 18/934,405, filed on Nov. 1, 2024, now abandoned.

(51) Int. Cl.
*B60R 21/2338* (2011.01)
*B60R 21/16* (2006.01)
*B60R 21/203* (2006.01)

(52) U.S. Cl.
CPC ...... *B60R 21/2338* (2013.01); *B60R 21/2035* (2013.01); *B60R 2021/161* (2013.01); *B60R 2021/23386* (2013.01)

(58) Field of Classification Search
CPC .............. B60R 21/203; B60R 21/2035; B60R 21/2338; B60R 21/239; B60R 2021/161;
(Continued)

(56) References Cited

U.S. PATENT DOCUMENTS 5,393,092 A 2/1995 Charns et al.
6,616,184 B2 * 9/2003 Fischer ................ B60R 21/233 280/743.2

(Continued)

FOREIGN PATENT DOCUMENTS

KR 20210112898 A 9/2021

OTHER PUBLICATIONS

Corresponding International Patent Application No. PCT/US2025/053253, International Search Report and Written Opinion, date mailed Feb. 27, 2026.

*Primary Examiner* — Laura Freedman
(74) *Attorney, Agent, or Firm* — Tarolli, Sundheim, Covell & Tummino LLP

(57) ABSTRACT

A tether protection panel configured to help protect a tether for tailor deployment of an airbag includes a first portion configured to be secured to an outer surface of the airbag and to at least partially extend along an inflator opening of the airbag, and a second portion configured to be folded over to at least partially overlie the first portion and form a first fold. The first portion is configured to be positioned on a first side of an inflator flange of the inflator and the second portion is configured to be positioned on a second side of the inflator flange. The first fold is configured to be positioned adjacent an edge of the inflator flange and extend from the first side of the inflator flange to the second side of the inflator flange. The first fold is configured to be positioned between the inflator flange and the tether so that the fold blocks inflation fluid from damaging the tether.

20 Claims, 5 Drawing Sheets

(58) Field of Classification Search
CPC ........... B60R 2021/23382; B60R 2021/23384; B60R 2021/23386; B60R 2021/23388; B60R 2021/2395
See application file for complete search history.

(56) References Cited

U.S. PATENT DOCUMENTS

| | | | | |
|---|---|---|---|---|
| 7,261,320 | B2 * | 8/2007 | Fredin | B60R 21/2338 280/736 |
| 7,275,761 | B2 * | 10/2007 | Gould | B60R 21/2338 280/743.2 |
| 7,354,064 | B2 * | 4/2008 | Block | B60R 21/23 280/739 |
| 7,658,400 | B2 * | 2/2010 | Wipasuramonton | B60R 21/2171 280/730.2 |
| 7,942,443 | B2 * | 5/2011 | Dennis | B60R 21/2338 280/743.1 |
| 8,262,130 | B2 * | 9/2012 | Fischer | B60R 21/2338 280/739 |
| 8,746,736 | B2 * | 6/2014 | Mendez | B60R 21/239 280/736 |
| 11,351,953 | B2 * | 6/2022 | Deutschmann | B60R 21/217 |
| 12,325,378 | B2 * | 6/2025 | Furtado | B60R 21/239 |
| 2006/0244247 | A1 * | 11/2006 | Debler | B60R 21/276 280/739 |
| 2007/0284864 | A1 | 12/2007 | Anaya et al. | |

* cited by examiner

TETHER PROTECTION PANEL FOR AIRBAG MODULE

RELATED APPLICATION

This application is a continuation-in-part application of U.S. patent application Ser. No. 18/934,405, filed Nov. 1, 2024, the entirety of which is hereby incorporated herein by reference.

TECHNICAL FIELD

This disclosure relates to a system for helping to protect an occupant of a vehicle upon the occurrence of an event, such as a vehicle collision. In particular, the present invention relates to a driver airbag module configured to be mounted on a vehicle steering wheel.

BACKGROUND

Vehicle safety systems implement a variety of measures for helping to protect an occupant in the event of a vehicle crash. One such measure includes the use of airbags to help cushion occupants from impacts with vehicle structures. One such airbag is a driver airbag mounted to the steering wheel. Driver airbags are inflatable to help protect the driver from impacts with the steering wheel and other adjacent vehicle structures.

Some driver airbags are configured to adapt their inflation and/or deployment characteristics in response to vehicle and/or occupant conditions that exist at the time of deployment. For example, driver airbags can have vents configured to selectively vent inflation fluid from the airbag in response to vehicle and/or occupant conditions at the time of the collision. Also, driver airbags can be configured to inflate to different shapes and volumes in response to vehicle and/or occupant conditions at the time of the collision.

The mechanism by which these airbag adaptations are implemented can vary. In some instances, the airbag can be configured to adapt passively, for example, by adapting to the occupant's position at the time of deployment. For example, the airbag could be configured to vent inflation fluid if the occupant engages the airbag early in deployment, and to block inflation fluid venting if the occupant engages the airbag at a later stage of deployment.

In other instances, the airbag can be configured to adapt actively, in response to sensed vehicle and/or occupant conditions. These conditions can include, for example, the sensed seat position and/or seat weight, the position of the occupant, the magnitude of the crash, or the type of crash (e.g., head-on, angular, offset, oblique, side impact, rollover, etc.).

One manner in which airbag deployment is controlled actively in response to these sensed conditions is through the use of tethers configured to be selectively actuated (e.g., released) in order to produce the desired airbag response. For example, a tether can be used to control the opening/closing of a vent in order to control airbag pressurization. As another example, a tether can be used to control the inflated shape/volume of the airbag by selective restraining/releasing a portion of the airbag.

SUMMARY

A tether protection panel configured to help protect a tether for tailor deployment of an airbag includes a first portion configured to be secured to an outer surface of the airbag and to at least partially extend along an inflator opening of the airbag, and a second portion configured to be folded over to at least partially overlie the first portion and form a first fold. The first portion is configured to be positioned on a first side of an inflator flange of the inflator and the second portion is configured to be positioned on a second side of the inflator flange. The first fold is configured to be positioned adjacent an edge of the inflator flange and extend from the first side of the inflator flange to the second side of the inflator flange. The first fold is configured to be positioned between the inflator flange and the tether so that the fold blocks inflation fluid from damaging the tether.

According to one aspect, the first portion of the tether protection panel can include a first opening configured to encircle the inflator opening and a first portion of the inflator extending through the inflator opening on the first side of the inflator flange. The tether protection panel can also include a second portion of the tether protection panel comprises a second opening configured to encircle a second portion of the inflator on the second side of the inflator flange.

According to another aspect, the first portion of the tether protection panel and the airbag can be configured to be compressed between the first side of the inflator flange and an airbag retainer, and the second portion of the tether protection panel can be configured to be compressed between the second side of the inflator flange and a reaction plate.

According to another aspect, the first portion of the tether protection panel can be secured to an outer surface of a rear panel of the airbag and at least partially encircles an inflator opening of the rear panel.

According to another aspect, the first portion of the tether protection panel can be configured to extend radially from the inflator so as to protect a corresponding portion of a panel of the airbag to which the first portion is secured.

According to another aspect, the tether protection panel can also include a third portion configured to be folded over to at least partially overlie the first portion and form a second fold. The third portion of the tether protection panel can be configured to be positioned on the second side of the inflator flange along with the second portion of the tether protection panel. The second fold can be configured to be positioned adjacent an edge of the inflator flange and extend from the first side of the inflator flange to the second side of the inflator flange. The second fold can be configured to be positioned between the inflator flange and the tether so that the fold blocks inflation fluid from damaging the tether.

According to another aspect, the second fold can be configured to be positioned on a side of the inflator opposite than the first fold.

According to another aspect, the second fold can be configured to be positioned adjacent a portion of the edge of the inflator flange that is different than a portion of the edge of the inflator flange adjacent which the first fold is positioned.

According to another aspect, the an airbag can include the tether protection panel according to any of the preceding aspects.

According to another aspect, the airbag can also include a reinforcing panel secured to the airbag. The first portion of the tether protection panel can be secured to the reinforcing panel and the airbag panel.

According to another aspect, the an airbag module can include the airbag according to the preceding aspects, and an inflator for inflating the airbag. The inflator can extend through the inflator opening in the first portion of the tether protection panel.

According to another aspect, the airbag module can also include a reaction plate and an airbag retainer. The first portion of the tether protection panel and the portion of the airbag to which the first portion is secured can be sandwiched between the inflator flange and the airbag retainer. The second portion of the tether protection panel can be sandwiched between the inflator flange and the reaction plate.

According to another aspect, the airbag module can also include one or more studs that extend through and fasten together the airbag retainer, the first portion of the tether protection panel, the portion of the airbag to which the first portion is secured, the inflator flange, the second portion of the tether protection panel, and the reaction plate.

According to another aspect, the airbag module can include a tether that is actuatable to control the deployment of the airbag. The tether protection panel can be configured to block inflation fluid from damaging the tether outside the airbag.

According to another aspect, the tether can be configured to control the operation of a vent for venting inflation fluid from the airbag.

According to another aspect, the tether can be configured to control the shape and/or inflatable volume of the airbag.

According to another aspect, the airbag module can include a tether actuation unit that is actuatable to release the tether.

According to another aspect, a vehicle safety system can include the airbag module of the preceding aspects.

According to another aspect, the vehicle safety system can include a sensor for sensing a vehicle crash and a controller configured to actuate the inflator to inflate the airbag. The controller can also be configured to actuate the tether actuation unit to control the deployment of the airbag.

According to another aspect, the a vehicle can include the vehicle safety system of the preceding aspect.

BRIEF DESCRIPTION OF THE DRAWINGS

The foregoing and other features will become apparent to one skilled in the art to which this disclosure relates upon consideration of the following description with reference to the accompanying drawings, in which.

DESCRIPTION

Figure 1:
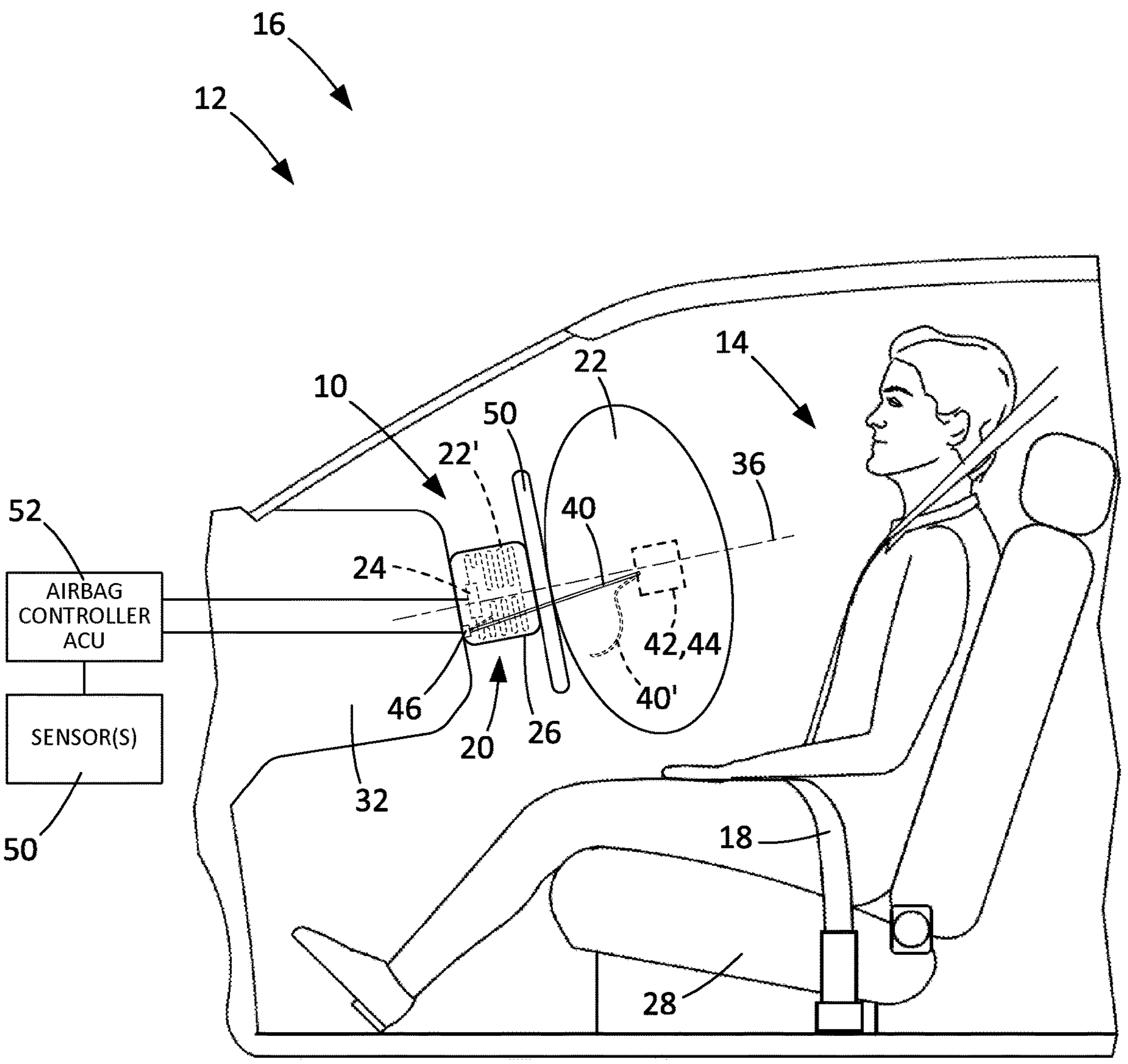
FIG. 1 illustrates schematically a vehicle including a driver airbag module according to an example configuration.

FIG. 1 illustrates an example configuration of a vehicle safety system 10 for helping to protect an occupant 14 of a vehicle 12. In this description, the occupant 14 is an operator/driver of the vehicle. The system 10 includes a driver front airbag module 20 configured to be mounted on a steering wheel 50 on a driver side 16 of the vehicle 12. The vehicle 12 also includes a seatbelt 18 for helping to restrain the occupant 14 in a vehicle seat 28.

The airbag module 20 includes an airbag 22, an inflation fluid source 24, such as an inflator, and a structure 26, such as a housing, for supporting the airbag 22 and inflator 24 in the vehicle 12. The airbag has a stored condition, indicated generally in dashed lines at 22', in which the airbag is deflated, folded, and stored in the housing 26. The housing 26 may include a cover that conceals the airbag 22 in the steering wheel 50 while in the stored condition, and opens in response to airbag deployment.

The inflator 24 is actuatable to inflate the airbag from the stored condition to a deployed condition illustrated generally in solid lines at 22. When the inflator 24 is actuated, the cover moves from a closed condition helping to conceal the airbag 22 in the housing 26 to an open condition allowing the airbag to inflate and deploy from the housing.

The airbag 22 inflates and deploys in a direction away from the steering wheel 50 and generally parallel to a steering axis 36 of the vehicle 12. In the deployed condition, the airbag 22 is positioned between the occupant 14 and the steering wheel 50 and between the occupant and an instrument panel 32 on the driver side 16 of the vehicle 12. The airbag 22, when in the deployed condition, helps absorb the forces of impacts with the airbag and helps distribute the impact forces throughout the airbag in order to cushion the occupant and provide a desired ride-down effect.

The airbag module 20 also includes a tether 40 connected to a portion of the airbag 22, such as a vent 42 or a portion of an airbag panel 44. The tether 40 is also connected to a tether actuation unit ("TAU") 46 that is actuatable to selectively release the tether. The TAU 46 is connected to the vehicle 12/airbag module 20 at a location outside the airbag 22, while the tether 40 extends through a slit or opening into the airbag, where it is connected to the vent 42/bag panel 44. Alternatively, the tether 40 could extend and be external to the vent 42/panel 44. In FIG. 1, the non-released condition of the tether is shown in solid lines at 40, and the released condition of the tether is shown in dashed lines at 40'. The tether 40 and TAU 46 can be configured, for example, to selectively open/close vent 42 and/or to selectively release the airbag panel 44. In doing so, the pressurization, venting, size, shape, etc. of the airbag 22 can be controlled by controlling whether or not the TAU 46 is actuated.

The vehicle safety system 10 also includes sensors 50 that are operatively connected to a controller 52. The sensors 50 can be any sensor used to determine vehicle conditions, occupant conditions, or to predict vehicle and/or occupant conditions. For instance, the sensors can include crash sensors, such as accelerometers, pressure sensors, RADAR sensors, LIDAR sensors, ultrasonic sensors, and cameras. The controller 52 can be any one or more controllers used to control the vehicle or vehicle subsystems. For instance, the controller 52 can include one or more controllers, such as a body control module ("BCM") and an airbag control unit ("ACU"), individually or through a communication path such as a controller area network ("CAN") bus.

The controller 52 is operative to implement a control algorithm that determines whether to actuate the inflator 24 to inflate and deploy the airbag. The control algorithm also determines whether to actuate the TAU 46 control or otherwise affect the inflation and deployment of the airbag through the selective release of the vent 42 and/or airbag panel 44.

Because the effectiveness of the protection afforded by the airbag 22 depends on rapid inflation and deployment, there can be some tendency for inflation fluid to escape the airbag in the area of the interface between the airbag and the inflator 24. These escaping gases, which can be both hot and high pressure/velocity, can escape the airbag 22 in an area through which the tether 40 extends.

Figure 2:
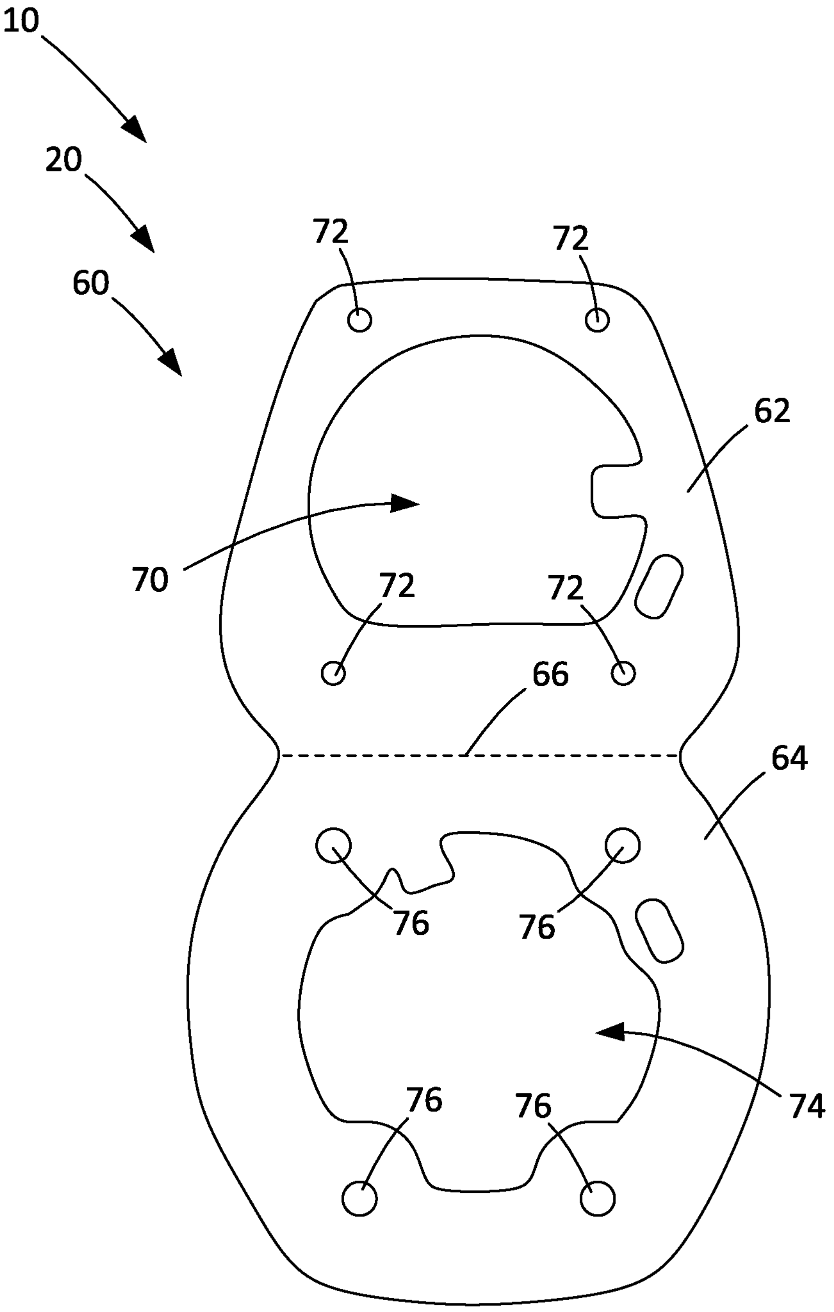
FIG. 2 is a plan view of a tether protection panel implemented in the airbag module.

Accordingly, the airbag module 20 includes features for helping protect the tether 40 against damage from gases escaping the airbag 22. To accomplish this, the airbag module 20 includes a tether protection panel 60 for helping to protect the tether 40. An example configuration of the tether protection panel 60 is shown in FIG. 2. The tether protection panel 60 can be formed from airbag fabric or other similar fabrics through conventional airbag manufacturing techniques, such as cutting or stamping operations. The tether protection panel 60 has two portions—an upper portion 62 and a lower portion 64—positioned on opposite sides of an imaginary fold line 66.

The upper and lower portions 62, 64 are similar but not necessarily symmetrical with reference to the fold line 66, although they could be. The symmetry, or lack thereof, of the upper and lower portions 62, 64 is not important. The upper portion 62 includes an inflator opening 70 configured to receive the inflator 24. The upper portion 62 also includes apertures 72 for receiving inflator studs. Similarly, the lower portion 64 includes an inflator opening 74 configured to receive the inflator 24, and apertures 76 for receiving inflator studs.

Figure 3:
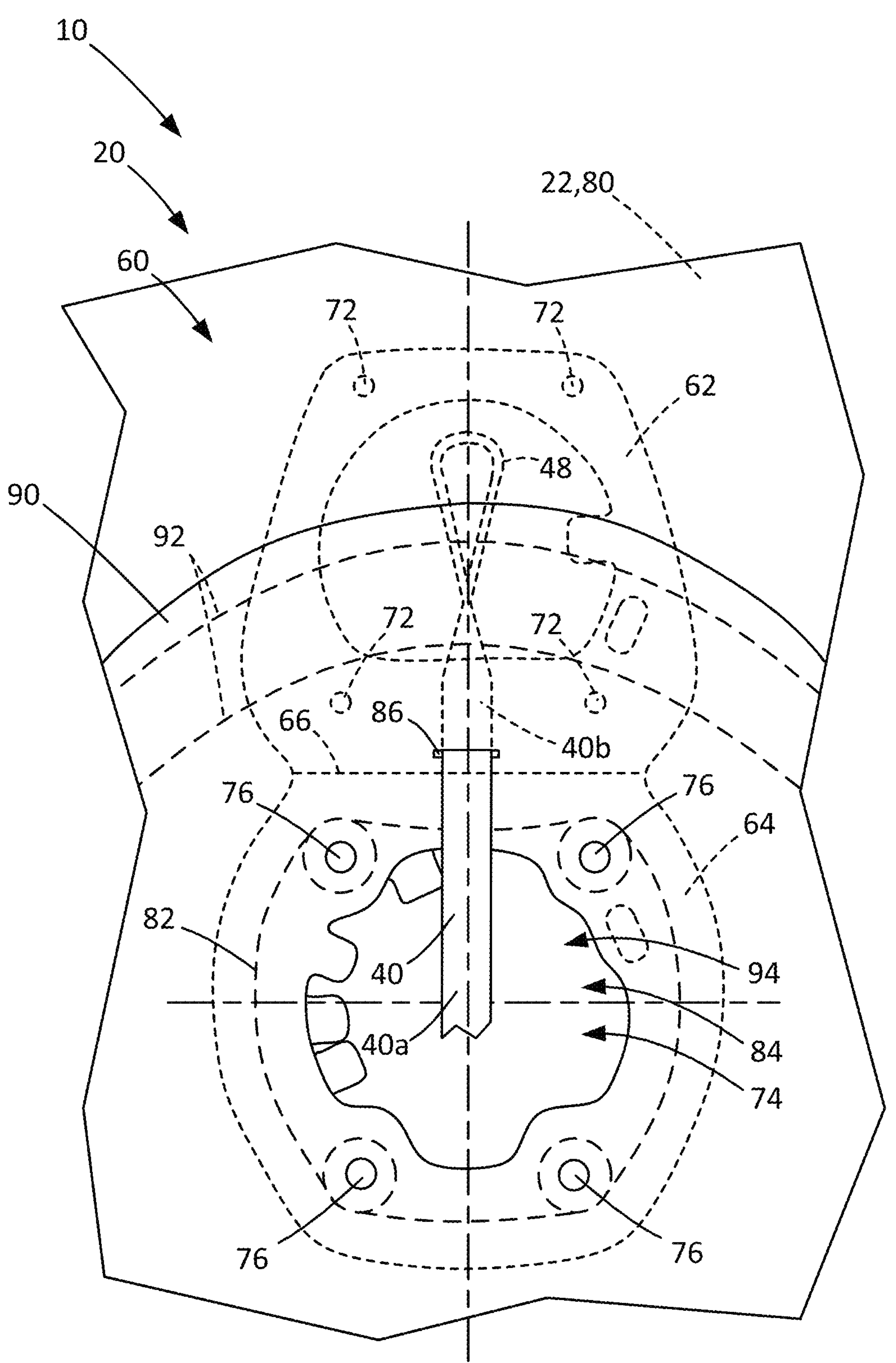
FIG. 3 is a magnified view illustrating certain assembled components of the driver airbag module.

Referring to FIG. 3, the airbag 22 has a rear panel 80 to which the lower portion 64 of the tether protection panel 60 is secured, for example, by stitching 82 so that the inflator opening 74 of the rear panel overlies an inflator opening 84 of the rear panel 80. As shown in FIG. 3, the stitching 82 can also encircle the openings 76. The view of FIG. 3 is from inside the airbag 22, with the tether protection panel 60 being secured to the outside of the rear panel 80, which is why the tether protection panel is shown in dashed (hidden) lines.

Inside the airbag 22, a reinforcing panel 90 can be secured to the rear panel 80, for example, by stitching 92. The reinforcing panel 90 can include an inflator opening 94 configured to overlie the inflator opening 84 of the rear panel 80. The inflator opening 74 of the lower portion 64 of the tether protection panel 60 is configured to overlie the inflator openings 84, 94 of the rear panel 80 and reinforcing panel 90.

As shown in FIG. 3, the tether 40 extends through a tether slot 86 that extends through both the rear panel 80 and the reinforcing panel 90 so that one portion **40*a* is positioned inside the airbag 22, and another portion 40*b* is positioned outside the airbag. As shown, the portion 40*b* positioned outside the airbag 22 can be configured to connect or otherwise interact with the TAU 46, e.g., via a loop 48. The assemblage of FIG. 3 is shown in a condition ready to assemble with the inflator 24 and other components that make up the airbag module 20**.

Figure 4:
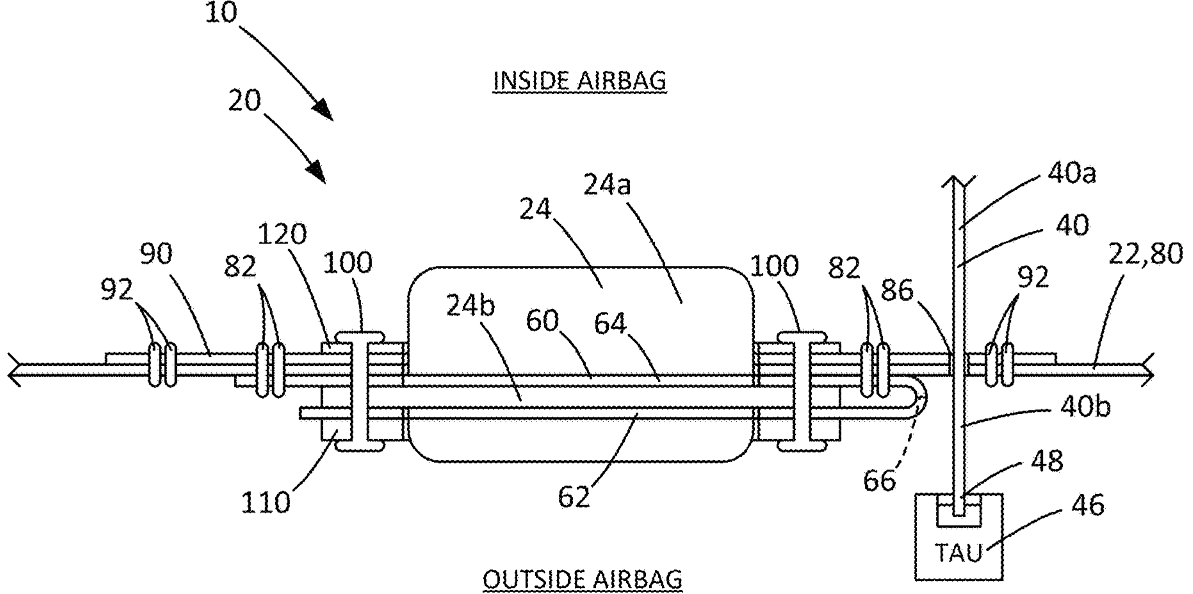
FIG. 4 is a schematic side view of the driver airbag module in an assembled condition.

FIG. 4 illustrates the assemblage of FIG. 3 assembled with the inflator 24 and other components to construct the airbag module 20. The inflator 24 includes an inflator body **24*a* and an inflator flange 24*b*. Inflator studs 100 extending through the inflator flange 24*b* connect the inflator 24 to the other components of the airbag module 20. Outside the airbag 22, a reaction plate 110 supports the inflator 24 and other components of the airbag module 20** and provides a means by which to connect the airbag module to the steering wheel (not shown).

Inside the airbag 22, a retainer 120 secures/presses the airbag 22, particularly the rear panel 80, the reinforcing panel 90, and the lower portion 64 of the tether protection panel 60 on an upper surface of the inflator flange **24*b*. The tether protection panel 60 is folded about the fold line 66 to position the upper portion 62 adjacent a lower surface of the inflator flange 24*b*. The inflator studs 100 extend through the openings 72 on the upper portion 62 of the tether protection panel 60 and the openings 76 on the lower portion 64 of the panel. The inflator studs 100 also extend through corresponding openings on the rear panel 80, reinforcing panel 90, the retainer 120, and the reaction plate 110. The airbag 22/rear panel 80, the reinforcing panel 90, and upper/lower portions 62,64 of the tether protection panel 60 are thereby sandwiched between the reaction plate 110 and the retainer 120, compressed by the inflator studs 100 and associated fasteners (e.g., nuts and/or rivetted connections) against the inflator flange 24*b***.

Advantageously, the tether protection panel 60 protects the tether 40 against damage from inflation fluid during airbag deployment. The tether protection panel 60 is configured so that the fold line 66 is positioned adjacent the slot 86 through which the tether 40 extends. Because the tether protection panel 60 is stitched to the airbag 22 via the stitching 82, inflation fluid cannot escape between the fabric layers of the rear panel 80, reinforcing panel 90 and lower portion 64. Because the upper portion 62 is folded over beneath the inflator flange **24*b*, the fold 66 blocks any inflation fluid that might otherwise escape between the lower portion 64 and the inflator flange 24*b* from directly hitting the tether 40. The tether protection panel 60 therefore protects the tether 40** from damage from inflation fluid discharged during airbag deployment.

Figure 5:
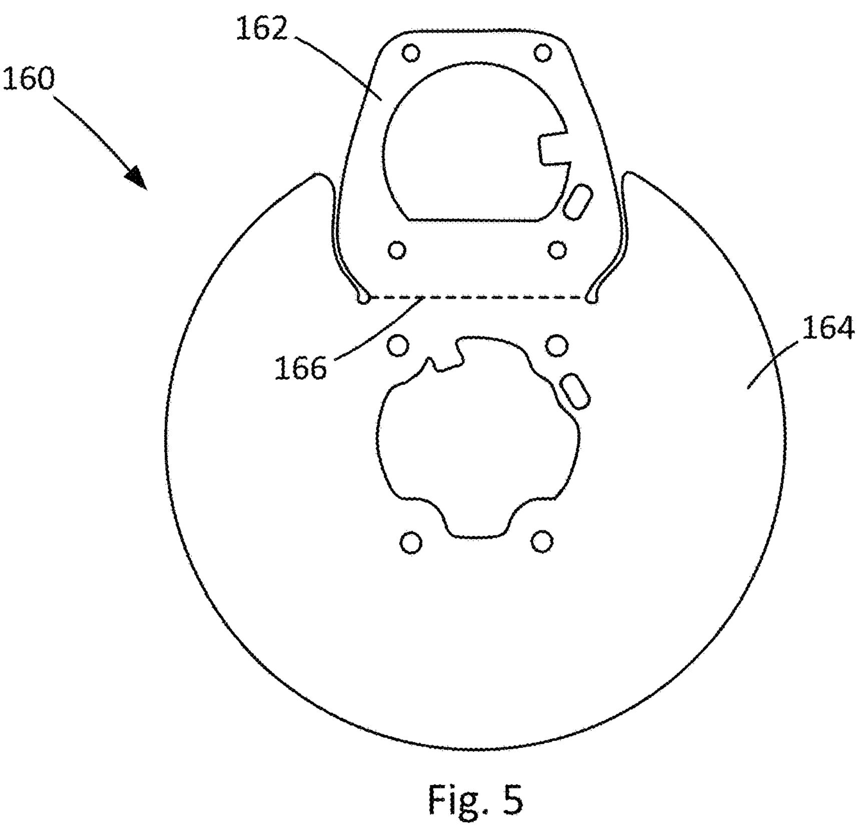
FIGS. 5 and 6 are plan views illustrating alternative configurations of the tether protection panel that can be implemented in the driver airbag module.

FIG. 5 illustrates an alternative configuration of the tether protection panel 160 that is similar/identical to the configuration of FIGS. 2-4, both in form and in function, with certain exceptions. The tether protection panel 160 includes an upper portion 162 that can be similar/identical to the configuration of FIGS. 2-4, and a lower portion 164 that is enlarged over that of FIGS. 2-4. The fold 166 of the tether protection panel 160 is configured to protect the tether in the same manner as the fold of FIGS. 2-4. The enlarged lower portion 164 additionally protects a large area of the rear panel 80 of the airbag 22 extending radially from the inflator 24 from damage (see FIGS. 2-4 for reference).

Figure 6:
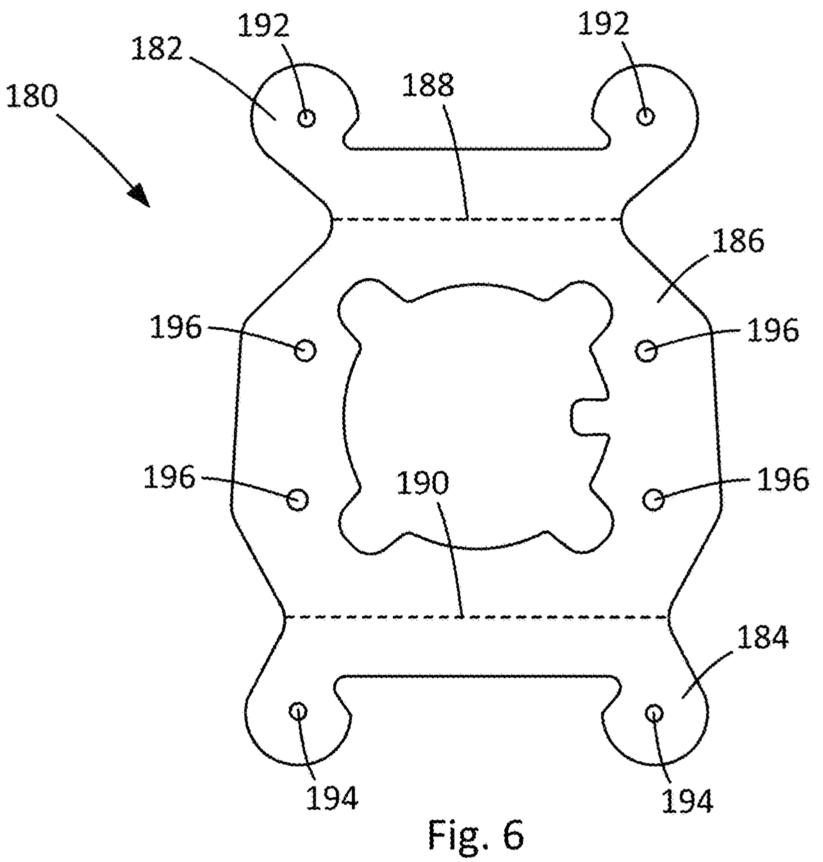

FIG. 6 illustrates an alternative configuration of the tether protection panel 180 that is similar/identical to the configuration of FIGS. 2-4, both in form and in function, with certain exceptions. The tether protection panel 180 includes an upper portion 182, a lower portion 184, and a central portion 186. The upper and lower portions 182, 184 are positioned on opposite sides of the central portion 186. The upper portion 182 is delineated from the central portion 186 by a fold line 188. The lower portion 184 is delineated from the central portion 186 by a fold line 190.

The upper portion 182 includes two fastener openings 192 configured to overlie corresponding fastener openings 196 in the central portion 186 and to receive the inflator studs 100 (see FIG. 4). The lower portion 184 includes two fastener openings 194 configured to overlie corresponding fastener openings 196 in the central portion 186 and to receive the inflator studs 100 (again, see FIG. 4). Thus, when the tether protection panel 180 is assembled according to the instruction of FIG. 4, there are two folds 188, 190 positioned on opposite sides of the inflator 24. The folds 188, 190 can thus be used to protect two tethers positioned on opposite sides of the inflator 24.

From the above description of the invention, those skilled in the art will perceive improvements, changes and modifications in the invention. Such improvements, changes and modifications within the skill of the art are intended to be covered by the appended claims.

Having described the invention, we claim:

1. A tether protection panel configured to help protect a tether for tailor deployment of an airbag, comprising a first portion configured to be secured to an outer surface of the airbag and to at least partially extend along an inflator opening of the airbag, and a second portion configured to be folded over to at least partially overlie the first portion and form a first fold;

wherein the first portion is configured to be positioned on a first side of an inflator flange of an inflator and the second portion is configured to be positioned on a second side of the inflator flange;

wherein the first fold is configured to be positioned adjacent an edge of the inflator flange and extend from the first side of the inflator flange to the second side of the inflator flange; and wherein the first fold is configured to be positioned between the inflator flange and the tether so that the first fold blocks inflation fluid from damaging the tether.

2. The tether protection panel recited in claim 1, wherein the first portion of the tether protection panel comprises a first opening configured to encircle the inflator opening and a first portion of the inflator extending through the inflator opening on the first side of the inflator flange, and the second portion of the tether protection panel comprises a second opening configured to encircle a second portion of the inflator on the second side of the inflator flange.

3. The tether protection panel recited in claim 2, wherein the first portion of the tether protection panel and the airbag are configured to be compressed between the first side of the inflator flange and an airbag retainer, and the second portion of the tether protection panel is configured to be compressed between the second side of the inflator flange and a reaction plate.

4. The tether protection panel recited in claim 1, wherein the first portion of the tether protection panel is secured to an outer surface of a rear panel of the airbag and at least partially encircles an inflator opening of the rear panel.

5. The tether protection panel recited in claim 1, wherein the first portion of the tether protection panel is configured to extend radially from the inflator so as to protect a corresponding portion of a panel of the airbag to which the first portion is secured.

6. The tether protection panel recited in claim 1, wherein the tether protection panel further comprises a third portion configured to be folded over to at least partially overlie the first portion and form a second fold;

wherein the third portion of the tether protection panel is configured to be positioned on the second side of the inflator flange along with the second portion of the tether protection panel;

wherein the second fold is configured to be positioned adjacent an edge of the inflator flange and extend from the first side of the inflator flange to the second side of the inflator flange; and wherein the second fold is configured to be positioned between the inflator flange and the tether so that the second fold blocks inflation fluid from damaging the tether.

7. The tether protection panel recited in claim 6, wherein the second fold is configured to be positioned on a side of the inflator opposite than the first fold.

8. The tether protection panel recited in claim 6, wherein the second fold is configured to be positioned adjacent a portion of the edge of the inflator flange that is different than a portion of the edge of the inflator flange adjacent which the first fold is positioned.

9. An airbag comprising the tether protection panel recited in claim 1.

10. The airbag recited in claim 9, further comprising a reinforcing panel secured to the airbag, wherein the first portion of the tether protection panel is secured to the reinforcing panel and the airbag.

11. An airbag module comprising the airbag recited in claim 9 and the inflator for inflating the airbag, wherein the inflator extends through the inflator opening in the first portion of the tether protection panel.

12. The airbag module recited in claim 11, further comprising a reaction plate and an airbag retainer, wherein the first portion of the tether protection panel and the portion of the airbag to which the first portion is secured are sandwiched between the inflator flange and the airbag retainer, and the second portion of the tether protection panel is sandwiched between the inflator flange and the reaction plate.

13. The airbag module recited in claim 12, further comprising one or more studs that extend through and fasten together the airbag retainer, the first portion of the tether protection panel, the portion of the airbag to which the first portion is secured, the inflator flange, the second portion of the tether protection panel, and the reaction plate.

14. The airbag module recited in claim 12, further comprising the tether that is actuatable to control the deployment of the airbag, wherein the tether protection panel is configured to block inflation fluid from damaging the tether outside the airbag.

15. The airbag module recited in claim 14, wherein the tether is configured to control a vent for venting inflation fluid from the airbag.

16. The airbag module recited in claim 14, wherein the tether is configured to control a shape and/or inflatable volume of the airbag.

17. The airbag module recited in claim 14, further comprising a tether actuation unit that is actuatable to release the tether.

18. A vehicle safety system comprising the airbag module recited in claim 17.

19. The vehicle safety system recited in claim 18, further comprising a sensor for sensing a vehicle crash and a controller configured to actuate the inflator to inflate the airbag, wherein the controller is also configured to actuate the tether actuation unit to control the deployment of the airbag.

20. A vehicle comprising the vehicle safety system recited in claim 19.

* * * * *